United States Patent [19]

Ramirez

[11] Patent Number: 5,299,529
[45] Date of Patent: Apr. 5, 1994

[54] AUTOMATIC FEEDER FOR DOGS AND OTHER ANIMALS

[76] Inventor: Peter Ramirez, P.O. Box 1344, Idyllwild, Calif. 92549

[21] Appl. No.: 72,534

[22] Filed: Jun. 4, 1993

Related U.S. Application Data

[63] Continuation-in-part of Ser. No. 36,065, Mar. 23, 1993, abandoned.

[51] Int. Cl.$^5$ ............................................. A01K 5/02
[52] U.S. Cl. .................................................. 119/51.11
[58] Field of Search ............... 119/51.11, 51.12, 51.13, 119/51.5, 55; 222/30

[56] References Cited

U.S. PATENT DOCUMENTS

| | | | |
|---|---|---|---|
| 4,640,229 | 2/1987 | Swartzendruber et al. | 119/51.11 |
| 4,688,520 | 8/1987 | Parks | 119/51.11 |
| 4,733,634 | 3/1988 | Hooser | 119/51.12 |
| 5,046,455 | 9/1991 | Christiansen et al. | 119/56.1 |
| 5,067,443 | 11/1991 | Hurnik et al. | 119/51.11 |

*Primary Examiner*—Thomas Price
*Attorney, Agent, or Firm*—Loyal M. Hanson

[57] ABSTRACT

An automatic feeder includes a computerized dispenser for dispensing different programmed quantities of food for each meal (e.g., 1–10 cups of dry food) to an animal at up to ten programmed times. The computerized dispenser includes food-dispensing components for dispensing food and, preferably, water-dispensing components for dispensing water. The computerized dispenser also includes a programmed microcomputer and integrated control circuitry operatively coupled to the food-dispensing components for automatically controlling the food-dispensing components in order to dispense different programmed quantities of food for each meal at programmed times. According to a major aspect of the invention, the integrated control circuitry includes components (e.g., a digital voice circuit) for recording and playing audio in order to enable an owner to record a message (e.g., a 30-second message) for automatic playback at preprogrammed times, normally just ahead of feeding time. The control circuitry preferably includes a telephone interface that enables remote control of the pet feeder by conventional telephone. It may include a video telephone interface and a personal computer interface. A battery backup protects against power failures.

8 Claims, 7 Drawing Sheets

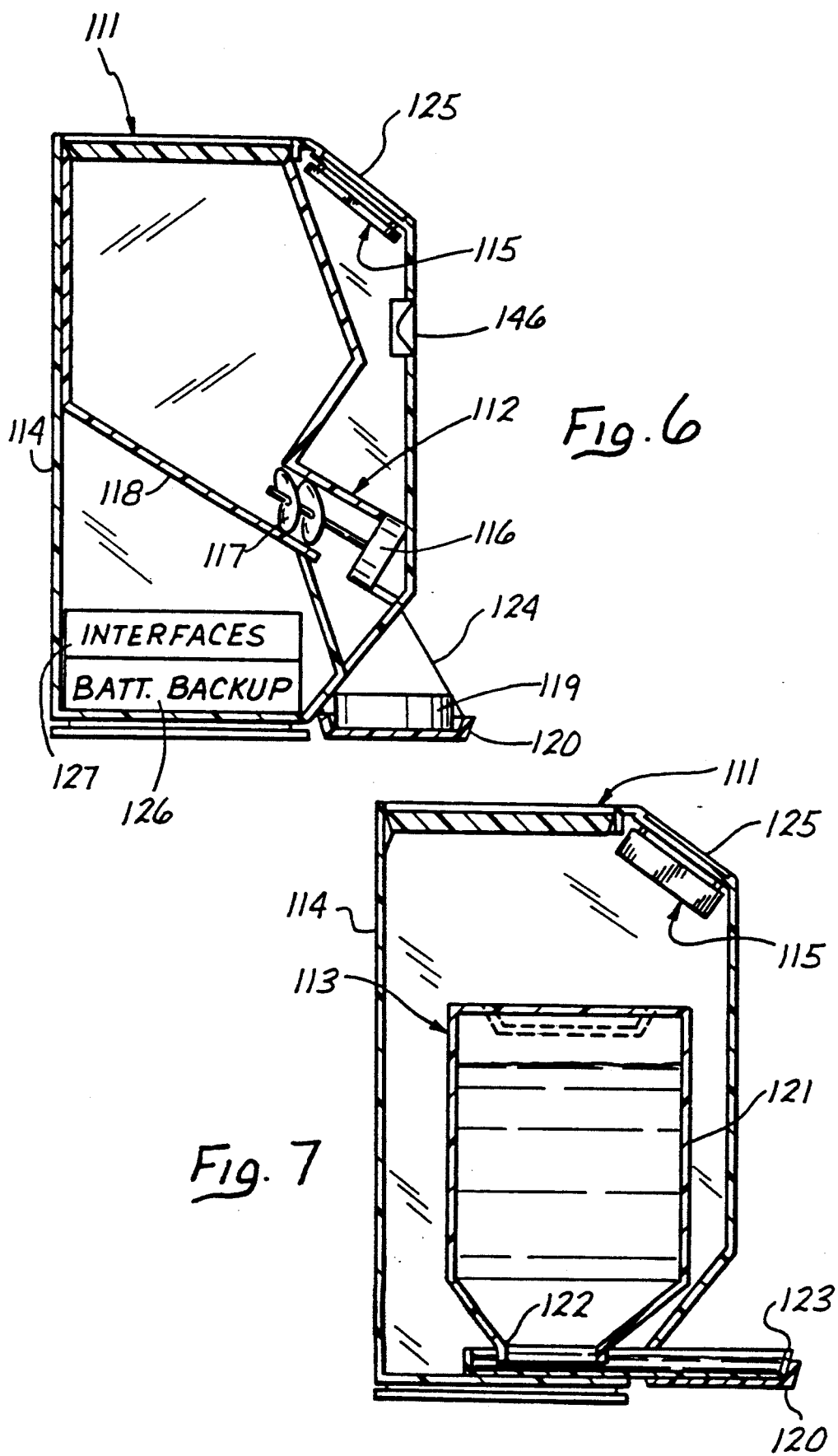

AUTOMATIC FEEDER FOR DOGS AND OTHER ANIMALS

CROSS REFERENCE TO RELATED APPLICATION

This application is a continuation in part of the U.S. patent application naming the same inventor that was assigned Ser. No. 08/036,065 and filing date Mar. 23, 1993 (the parent application), now abandoned.

BACKGROUND OF THE INVENTION

1. Technical Field

This invention relates generally to automatic feeders for dogs and other animals, and more particularly to a computerized feeder with increased functionality.

2. Background Information

Recall how the recurring task of feeding and watering the dog can interfere with other activities. One may have to drive all the way home after work before going out to dinner in order to feed and water the dog. An overnight business trip or short vacation may require a kennel and involve veterinarian services before and afterwards. Even then, unfamiliar scents and surroundings at the kennel may upset the dog, and knowledge of that possibility may worry the owner. Moreover, emergencies, weather conditions, and various unforeseen contingencies may prevent one from returning home on schedule. So, dog-feeding and watering responsibilities can cause some problems.

Some mechanized dog feeders attempt to alleviate those problems by automatically dispensing measured amounts of food and water at timed intervals. An existing feeder, for example, may include a motor-driven auger that dispenses food from a storage bin and an electrically operated valve that dispenses water from a tank. They operate automatically in the owner's absence to meet a predetermined feeding schedule. However, the dog may react poorly to being fed by a machine. For that reason, existing automatic feeders can be somewhat poor substitutes for the owner's presence, and so owners need a better way to feed their dogs.

SUMMARY OF THE INVENTION

This invention solves the problems outlined above by providing an automatic feeder with computerized control circuitry that dispenses different programmed quantities of food (e.g., dry dog food) for each meal at programmed mealtimes and plays a prerecorded 30-second message, preferably in the owner's voice. The owner prerecords a short conversation and/or meal-call message. The feeder then plays it back at preprogrammed times, just before dispensing the food. That tends to create a friendly, familiar atmosphere despite the otherwise impersonal nature of a mechanical feeder. Other features include telephone interfaces for conventional and video telephones, an interface for a personal computer, and a battery backup that further extends feeder functionality. Of course, an automatic feeder constructed according to the invention may be used for feeding animals other than dogs, and it is intended that any such automatic feeders fall within the scope of the claims.

In terms of the claim language subsequently developed, an automatic feeder constructed according to the invention includes means in the form of a computerized dispenser for dispensing different programmed quantities of food for each meal to an animal at programmed times. The computerized dispenser includes food-dispensing means for dispensing food and, preferably, water-dispensing means for dispensing water. It also includes means in the form of integrated control circuitry operatively coupled to the food-dispensing means for automatically controlling the food-dispensing means in order to dispense different programmed quantities of food for each meal at programmed times.

The computerized dispenser may, for example, include a storage bin large enough for fifteen pounds of dog food and an electrically powered auger for dispensing the food into a bowl at the feeding station. It may also include a 3-gallon water tank arranged to automatically dispense water into another bowl or water tray. In addition, the integrated control circuitry may include a commercially available, microcomputer with a liquid crystal display (LCD) similar to those commonly used for ovens and other kitchen appliances. The combination of those components form a computerized dispenser that operates automatically to dispense different quantities of food for each meal at preprogrammed times. They define at least one feeding station (i.e., at least one feeding position), although multiple feeding stations may be provided within the inventive concepts disclosed.

According to a major aspect of the invention, the integrated solid-state control circuitry also includes means for recording and playing audio. The means for doing that may include a digital recorder. It is arranged and interconnected to enable an owner to record a 30-second message for automatic playback at feeding time.

According to another aspect of the invention, the control circuitry includes an interface for a conventional telephone that enables remote control of the pet feeder with conventional telephone. Another aspect provides an interface for a video telephone so that the owner can actually see the pet while talking to it. Yet another aspect provides an interface for a personal computer so the owner can control the pet feeder with a personal computer. Still another aspect provides a battery backup feature that keeps the feeder functioning in case of a household power failure. The following illustrative drawings and detailed description make the foregoing and other objects, features, and advantages of the invention more apparent.

BRIEF DESCRIPTION OF THE DRAWINGS

FIG. 6 is a cross sectional view taken on line 6—6 of FIG. 5 to show the food-dispensing components;

FIG. 7 is a cross sectional view taken on line 7—7 of FIG. 5 to show the water-dispensing components;

DESCRIPTION OF A PREFERRED EMBODIMENT

First Embodiment

Figure 1:
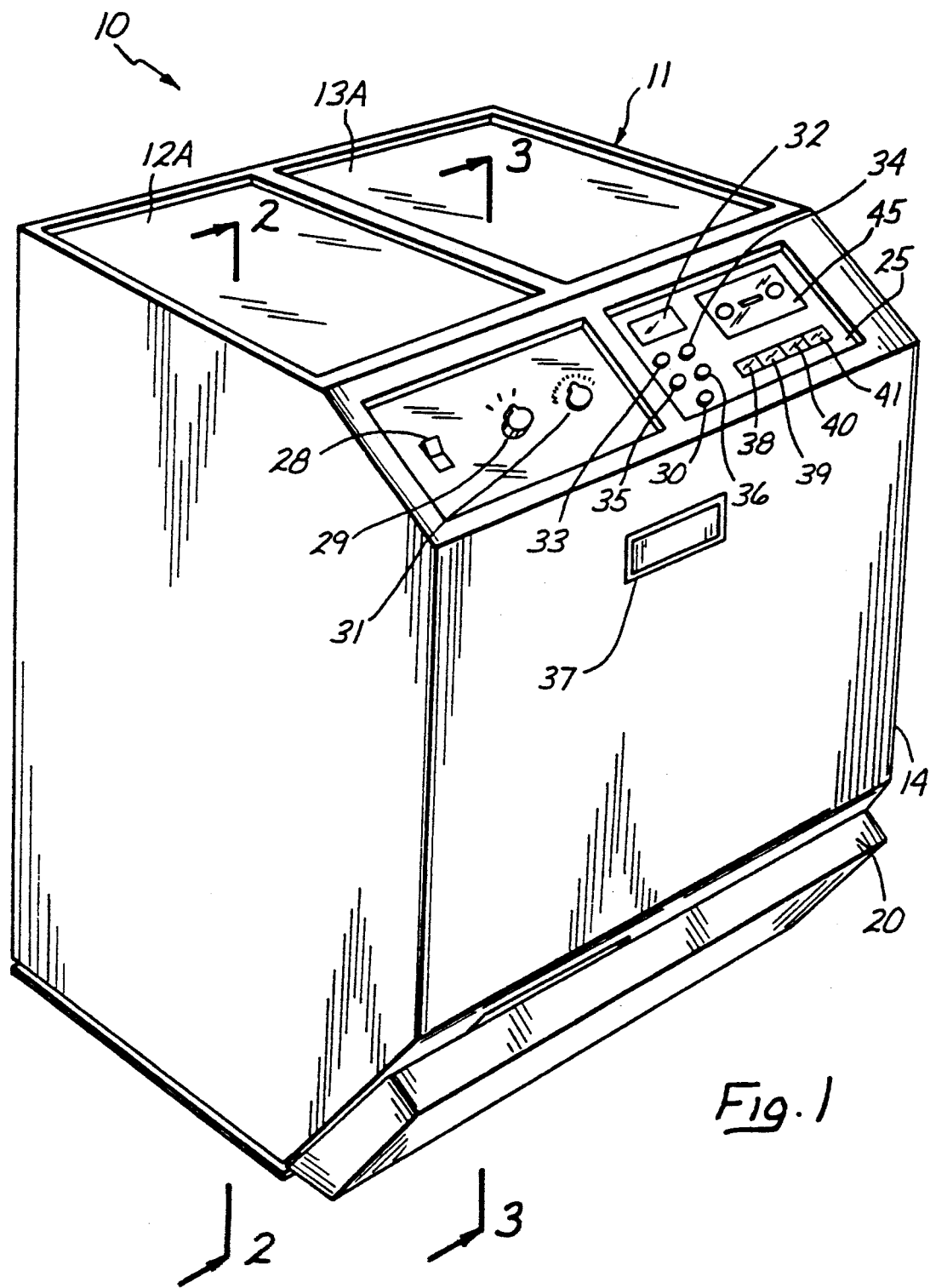
FIG. 1 of the drawings is a three-dimensional view of an automatic feeder constructed according to the invention.

FIGS. 1-4 of the drawings show a first embodiment of an automatic feeder 10 constructed according to the invention. Generally, the automatic feeder 10 includes a computerized dispenser 11 (FIGS. 1-3) having a food-dispensing arrangement 12 (FIG. 2) and a water-dispensing arrangement 13 (FIG. 3) housed within an ABS plastic cabinet 14. The food-dispensing arrangement 12 operates under control of integrated control circuitry 15 (FIGS. 2-4) to dispense different programmed quantities of food for each meal (e.g., 1-10 cups of dry dog food) at programmed times (e.g., ten times each day) while the water-dispensing arrangement 13 dispenses drinking water.

Figure 2:
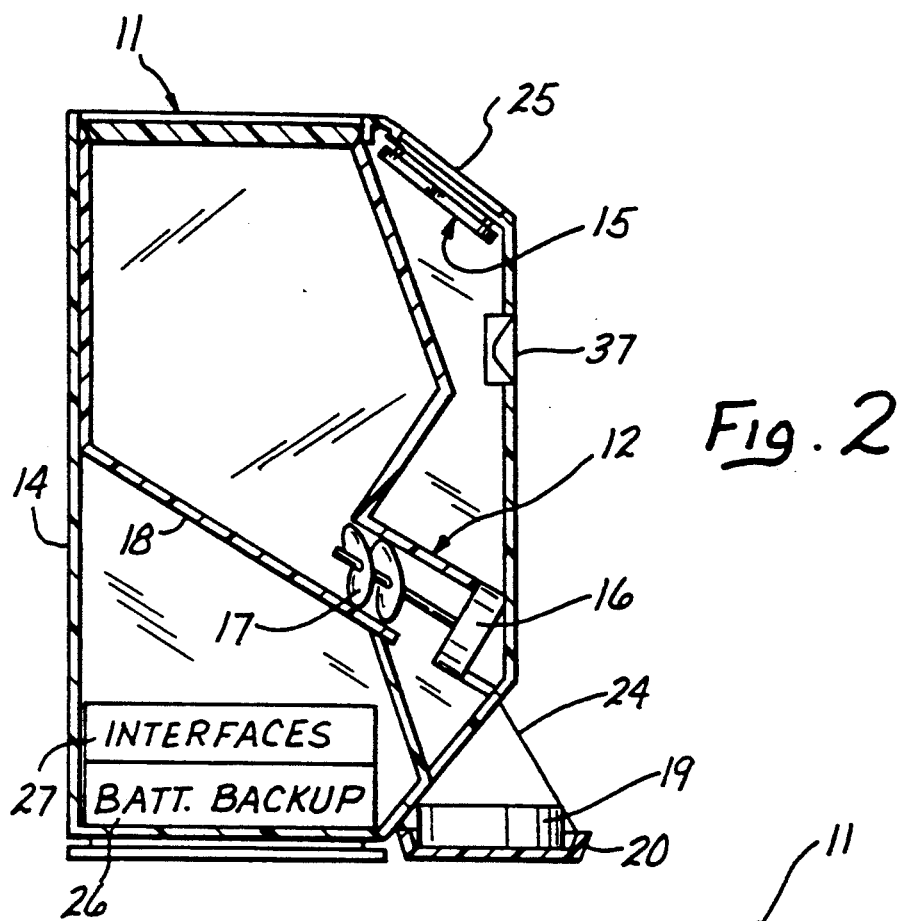
FIG. 2 is a cross sectional view taken on line 2—2 of FIG. 1 to show the food-dispensing components.
Figure 3:
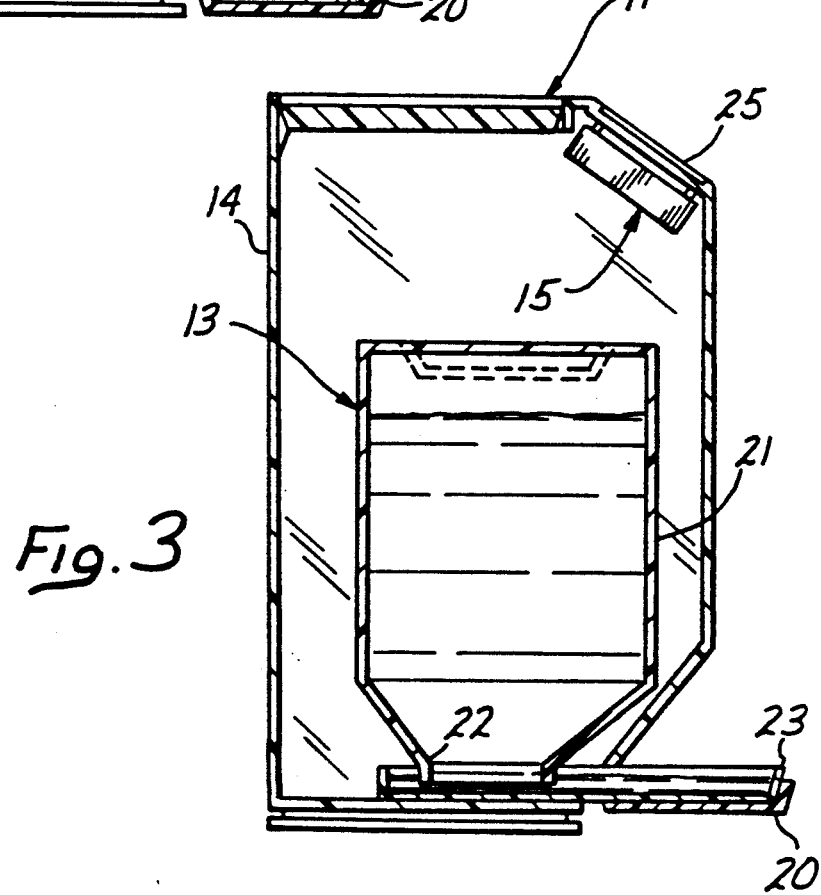
FIG. 3 is a cross sectional view taken on line 3—3 of FIG. 1 to show the water-dispensing components.

Accessible through a sliding door 12A in the cabinet 14 (FIG. 1), the food-dispensing arrangement 12 includes a motor 16 that operates at programmed times under control of the control circuitry 15 to drive an auger 17 (FIG. 2). That causes the auger 17 to dispense a programmed quantity of food (e.g., one cup of dry dog food per auger revolution) under influence of gravity from a food bin 18 into a bowl 19. The bowl 19 rests atop a tray 20 that can be pivoted from the open position shown in FIGS. 2 and 3 to the closed shipping position shown in FIG. 1.

Accessible through a sliding door 13A, the water-dispensing arrangement 13 includes a three-gallon plastic water tank 21 (FIG. 3) with a downwardly opening neck 22 that is pointed upwardly for filling and then placed downwardly within a water tray 23 resting atop the tray 20 to the right of a partition 24 visible in FIG. 2. That forms an extremely reliable atmospheric-pressure dispensing arrangement requiring no water level detector or water valve. Water flows from the water tank 21 into the tray 23 until water rises in the tray 23 to a level such that atmospheric pressure on water in the tray 21 prevents further flow of water out of the water tank 21.

The integrated control circuitry 15 is integrated in the sense that it includes an electrical circuit with at least one integrated circuit. It also includes various operator controls on a sloping control panel 25 (FIGS. 1-2) as well as battery backup circuitry 26 and interface circuitry 27 (FIG. 2). It may be implemented in any of various ways using many known components and design techniques to function as claimed without departing from the inventive concepts disclosed.

Regarding the control panel 25, an on-off switch 28 turns the unit on and off and it includes a small green indicator light that lights when the unit is on. A three-position rotary mode switch 29 enables selection of a calibrate mode, an automatic mode, and a manual mode of operation. The calibrate mode is for programming the control circuitry 15. The automatic mode sets the feeder for automatic operation after programming has been completed. In the manual mode, the user dispenses the programmed quantity of food by pressing a manual pushbutton 30 on the control panel 25. A ten-position selector switch 31 enables the user to set the programmed quantity of food to be dispensed at each programmed time or manual feeding (i.e., 1 to 10 cups).

The controls relating to the time of feeding include an LCD display 32 and programming pushbuttons 33-36 that are used to program a timer/clock module which is part of the control circuitry 15. The programming pushbuttons 33-36 are similar to the pushbuttons of the timer/clock modules used for ovens and other kitchen appliances. The pushbutton 33 is the SET button, the pushbutton 34 is the HOURS pushbutton, the pushbutton 35 is the MINUTES pushbutton, and the pushbutton 36 is the MANUAL pushbutton. The user first puts the mode switch 29 in the calibrate position. Once that is done, he sets the correct time of day using the programming pushbuttons 33-36. Next, he uses the programming pushbuttons 33-36 to set the feeding times. Then he places the mode switch 29 in the automatic position and that starts automatic operation according to the quantity of food set with the switch 31 and the feeding times programmed with the pushbuttons 33-36.

Figure 4:
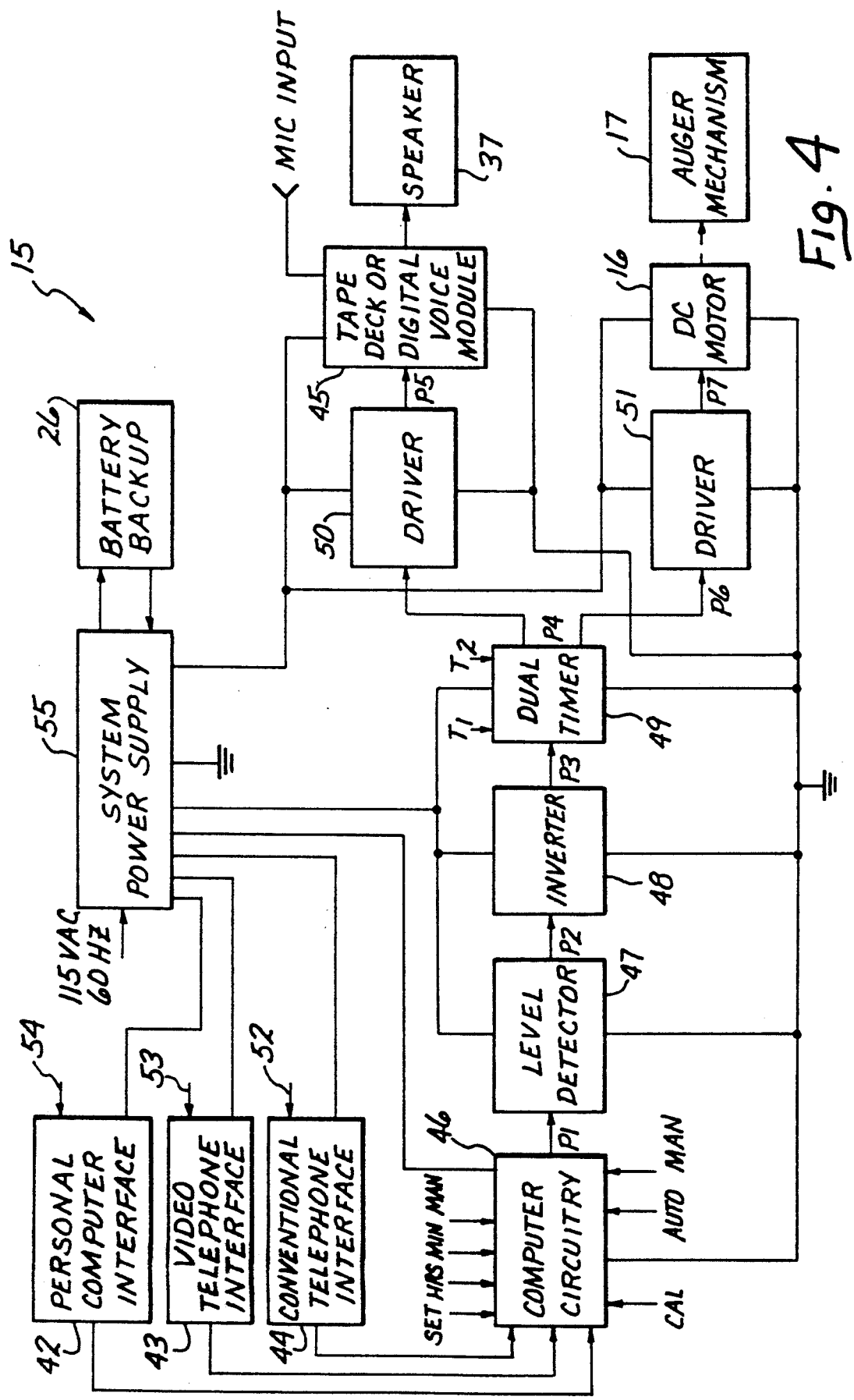
FIG. 4 is a block diagram of the control circuitry.

In addition to dispensing programmed quantities of food (set by the switch 31) at programmed times (set with the pushbuttons 33-36), an integrated tape deck or digital recorder 45 records and plays audio. That enables an owner to record a message for automatic playback at preprogrammed times over a speaker 37 visible in FIGS. 1 and 2. The block circuit diagram of FIG. 4 shows that and other aspects of the control circuitry 15. Based upon the foregoing and subsequent descriptions, one of ordinary skill in circuit design can implement the invention using known components and design techniques.

Conventional 115 VAC 60 Hz household current powers a system power supply 55. The power supply 55 produces direct current that powers the control circuitry 15, including the battery backup circuitry 26 (FIGS. 2 and 4) and the interface circuitry 27 (FIG. 2) which may include one or more of a personal computer interface 42, a video telephone interface 43, and a conventional telephone interface 44 (FIG. 4). The control circuitry 15 also includes computer circuitry 46 for controlling operation and audio circuitry 45 which may include a known type of tape deck or digital voice module. The power supply 55 powers those circuits and also the motor 16 that drives the auger 17.

The user programs the control circuitry 15 as previously described using the various controls on the control panel 25 shown in FIG. 1. Those controls are shown as the various inputs to the computer circuitry 46 shown in FIG. 4. In addition, the user records a message using the tape deck or digital recorder 45. The tape deck control pushbuttons are similar to the control pushbuttons used on a conventional cassette tape deck. The pushbutton 38 is the EJECT/STOP pushbutton, the pushbutton 39 is the REWIND pushbutton, the pushbutton 40 is the PLAY pushbutton, and the pushbutton 41 is the RECORD pushbutton. The user first puts the mode switch 29 in the calibrate position. Once that is done, he records a 30-second message or meal call using the pushbuttons 40 and 41 and speaking into the speaker 37. Of course, a separate microphone may be used for recording without departing from the inventive concepts described.

Next, the user depresses the pushbutton 38 to stop the recording. Then he uses the pushbutton 39 to rewind the cassette tape, and again uses the pushbutton 38 to stop the rewind. Then he places the mode switch 29 in the automatic position. That enables an owner to automatically play back a message at preprogrammed times over the speaker 37 visible in FIGS. 1 and 2.

Then, with the quantity of food programmed by the setting of the switch 31, the times of feeding programmed with the pushbuttons 33-36, and a message prerecorded on the audio circuitry 45, the user places the mode switch 29 in the automatic mode. Thereafter, the computer circuitry 46 produces a start pulse P1 at each scheduled feeding time (e.g., a 1.5 VDC level and a one second duration). The pulse P1 occurs at the output of the computer circuitry 46 as indicated in FIG. 4.

The amplitude of the pulse P1 increases to an ON level at t=0. That triggers a level detector 47 which produces a one-second pulse P2. An inverter 48 inverts the pulse P2 to produce a pulse P3 that is coupled to a dual timer 49. The dual timer 49 responds to the occurrence of the pulse P3 by producing a 30-second pulse P4 that is coupled to a driver 50. The driver 50 responds to the occurrence of the pulse P4 by producing a 30-second pulse P5 that actuates the audio circuitry 45 for thirty seconds in order to playback a prerecorded message.

The dual timer 49 also produces a pulse P6 in response to the occurrence of the pulse P3. It is coupled to a driver 51 and the driver 51 responds by producing a pulse P7 that actuates the motor 16 in order to dispense the programmed quantity of food. The duration of the pulse P6 and the pulse P7 is set between 0.5 second to 10 seconds by adjustment of the switch 31 in FIG. 1 in order to program the quantity of food dispensed. The input T1 to the dual timer 49 is an internal potentiometer adjustment for adjusting the duration of the prerecorded message. The input T2 is an external potentiometer adjustment (switch 31) for dispensing programmed quantities of food.

As an example of some commercially available components that may be used in the control circuitry 15, the computer circuitry 46 may include a PTS-31 LCD timer/clock module that is available from Dakota Digital of Sioux Falls, S. Dak. It includes the display 32 shown in FIG. 1. In addition, the dual timer 49 may include a SE556 dual monolithic timing circuit available from Signetics of Sunnyvale, Calif. Of course, one of ordinary skill in the art may implement the invention using any of various other known components.

Concerning the battery backup 26 it may be implemented using known components and design techniques to include a battery that is maintained charged by a trickle charge from the power supply 55. In the event of a power failure, the battery backup 26 supplies power to all the components of the feeder.

Concerning the interfaces 42-44, they may also be implemented using known components and design techniques. The conventional telephone interface 44 may be configured to plug into a conventional telephone line at input 52, answer a received call automatically, and respond to a predetermined sequence of tones to control the feeder accordingly (e.g., initiate an additional voice message and feeding). The video telephone interface plugs into a telephone line at input 53, performs the conventional telephone interface function, and enables hookup of a video telephone that the user places in a convenient location for viewing a space adjacent to the feeder so he can see his pet. The personal computer interface 42 receives data from a personal computer via input 54 and controls the feeder accordingly. The personal computer interface 42 may include a modem for communications over a telephone line that is plugged into the input 54. Alternatively, the personal computer interface 42 may be configured for direct coupling to a serial or parallel port on the personal computer.

Second Embodiment

FIGS. 5-9 of the drawings show a second embodiment of an automatic feeder 100 constructed according to the invention. It is similar in many respects to the first embodiment just described and so the following description focuses on differences. For convenience, reference numerals designating parts of the feeder 100 are increased by one hundred over those designating corresponding parts of the feeder 10.

Similar to the automatic feeder 10, the feeder 100 includes a computerized dispenser 111 (FIGS. 5-7) having a food-dispensing arrangement 112 (FIG. 6) and a water-dispensing arrangement 113 (FIG. 7) housed within an ABS plastic cabinet 114. The food-dispensing arrangement 112 operates under control of a microcomputer and integrated control circuitry 115 (FIGS. 6-8) to dispense different programmed quantities of food for each meal (e.g., 1-10 cups of dry dog food) at programmed times (e.g., ten times each day) while the water-dispensing arrangement 113 dispenses drinking water.

Accessible through a sliding door 112A in the cabinet 114 (FIG. 5), the food-dispensing arrangement 112 includes a stepper motor 116 that operates at programmed times under control of the control circuitry 115 to drive an auger 117 (FIG. 6). That causes the auger 117 to dispense a programmed quantity of food (e.g., one cup of dry dog food per auger revolution) under influence of gravity from a food bin 118 into a bowl 119. The bowl 119 rests atop a tray 120 that can be pivoted from the open position shown in FIGS. 6 and 7 to the closed shipping position shown in FIG. 5.

Accessible through a sliding door 113A, the water-dispensing arrangement 113 includes a three-gallon plastic water tank 121 (FIG. 7) with a downwardly opening neck 122 that is pointed upwardly for filling and then placed downwardly within a water tray 123 resting atop the tray 120 to the right of a partition 124 visible in FIG. 6 to form an atmospheric-pressure dispensing arrangement similar to that of the feeder 10.

Figure 5:
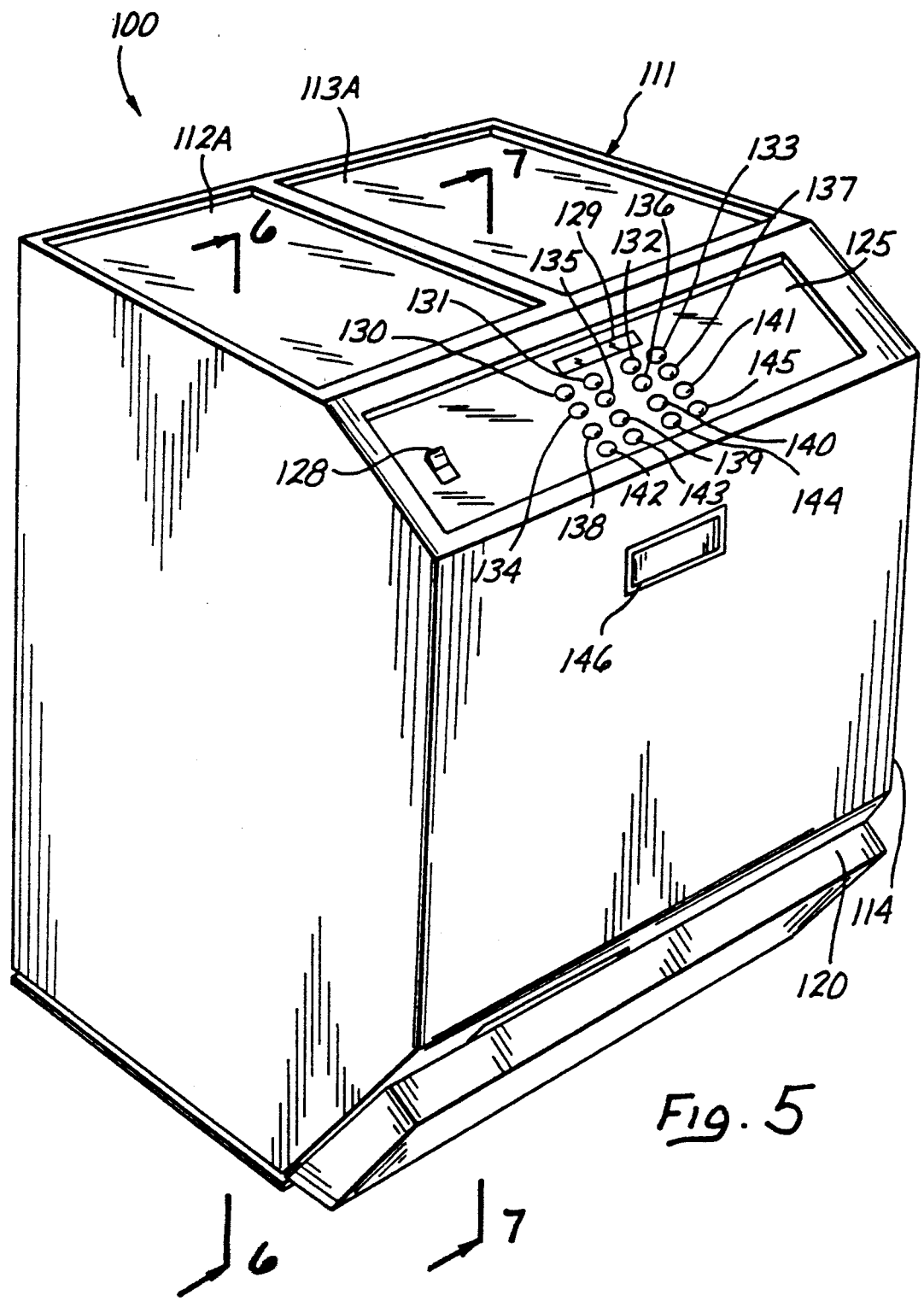
FIG. 5 is a three-dimensional view of a second embodiment of an automatic feeder constructed according to the invention.

The integrated control circuitry 115 is integrated in the sense that it includes an electronic circuit with a microcomputer (e.g., a single 8-bit microcomputer) and at least one integrated circuit. The microcomputer has been programmed (e.g., using software written in C language) and it controls all aspects of the feeder, including a digital voice module. Operator controls are located on a sloping control panel 125 (FIGS. 5-7). Battery backup circuitry 126 and interface circuitry 127 (FIG. 6) are located at the lower left side of the cabinet 114.

Regarding the control panel 125, an on-off switch 128 turns the unit on and off and it includes a small green indicator light that lights when the unit is on. Operating and programming functions are controlled by a 4×4 pressure sensitive membrane keyboard with pushbuttons 130-145 and an LCD instruction board 129. The LCD instruction board is user friendly and menu-driven, similar to those found at bank automatic teller machines.

The entire operating and programming functions are controlled by the combination of the LCD instruction board 129 and the 4×4 pressure sensitive membrane keyboard pushbuttons 130-145. The operating mode is determined by a Run pushbutton 130, a Program pushbutton 131, and a Manual pushbutton 132, respectively. The Run pushbutton 130 is pressed after all of the programming has been completed and automatic operation of the feeder is desired. The Program pushbutton 131 is pressed whenever programming of the microcomputer is desired. The Manual pushbutton 132 is pressed to override the microcomputer and provide manual feeding.

An Enter pushbutton 133 is pressed each time a program entry is made. A Record Voice pushbutton 134 is pressed whenever a meal call message is to be recorded. An AM/PM pushbutton 135 is pressed to set the proper time of day. Pushbuttons 136–145 are labeled 0 through 9 respectively and are used to numerically set the correct time of day (hour and minute), meal number (1–10), time for the desired meals (hour and minute), and the cups of food desired for each meal (1–10).

The programming procedure is as follows: To program the microcomputer for the time of day, number of meals (1–10), hour and minute of each meal, cups of food (1–10) for each meal, the user first depresses the Program pushbutton 131. Then he will be sequentially guided with programming instructions that will appear on the LCD instruction board.

After depressing the Program pushbutton 131, the instruction board will read, "Ready for programming. First press the AM/PM pushbutton for the correct indication on the instruction board, then press Enter."

Next, the instruction board will read, "Set the correct time of day. First set the hour." After the correct hour is displayed on the instruction board, the board will instruct "Press Enter."

Next, the instruction board will read, "Set the correct minute(s)." After the correct minute(s) is displayed, the board will instruct, "Press Enter."

Next, the instruction board will read, "Set the meal number (1–10)." After the meal number is displayed, the board will instruct, "Press Enter."

Next, the instruction board will read, "Select the number of cups (1–10) of food desired." After the cups of food are displayed, the board will instruct, "Press Enter."

At this stage, the correct time of day, the time (hour and minute) of the first meal, and the number of cups of food (1–10) desired for this meal have been programmed. The same procedure is used for additional meals (2–10).

To record the meal call or message, the user will depress the Record Voice pushbutton 134. Next, the instruction board will read, "Ready to record." Start recording by speaking into the speaker. You have 30 seconds." At the end of the 30-second recording period, the instruction board will instruct, "Press Enter."

At this stage, the programming of the microcomputer has been completed. All of the desired meals have been programmed (time and cups of food) and the meal call message have been recorded. The user now has to depress the Run pushbutton 130 to set the feeder for automatic operation. When in the Run condition, at the programmed feeding time, the 30-second meal call will first be heard on speaker 146 (FIGS. 5–6) followed by the dispensing of the programmed cups of food (1–10).

Figure 8:
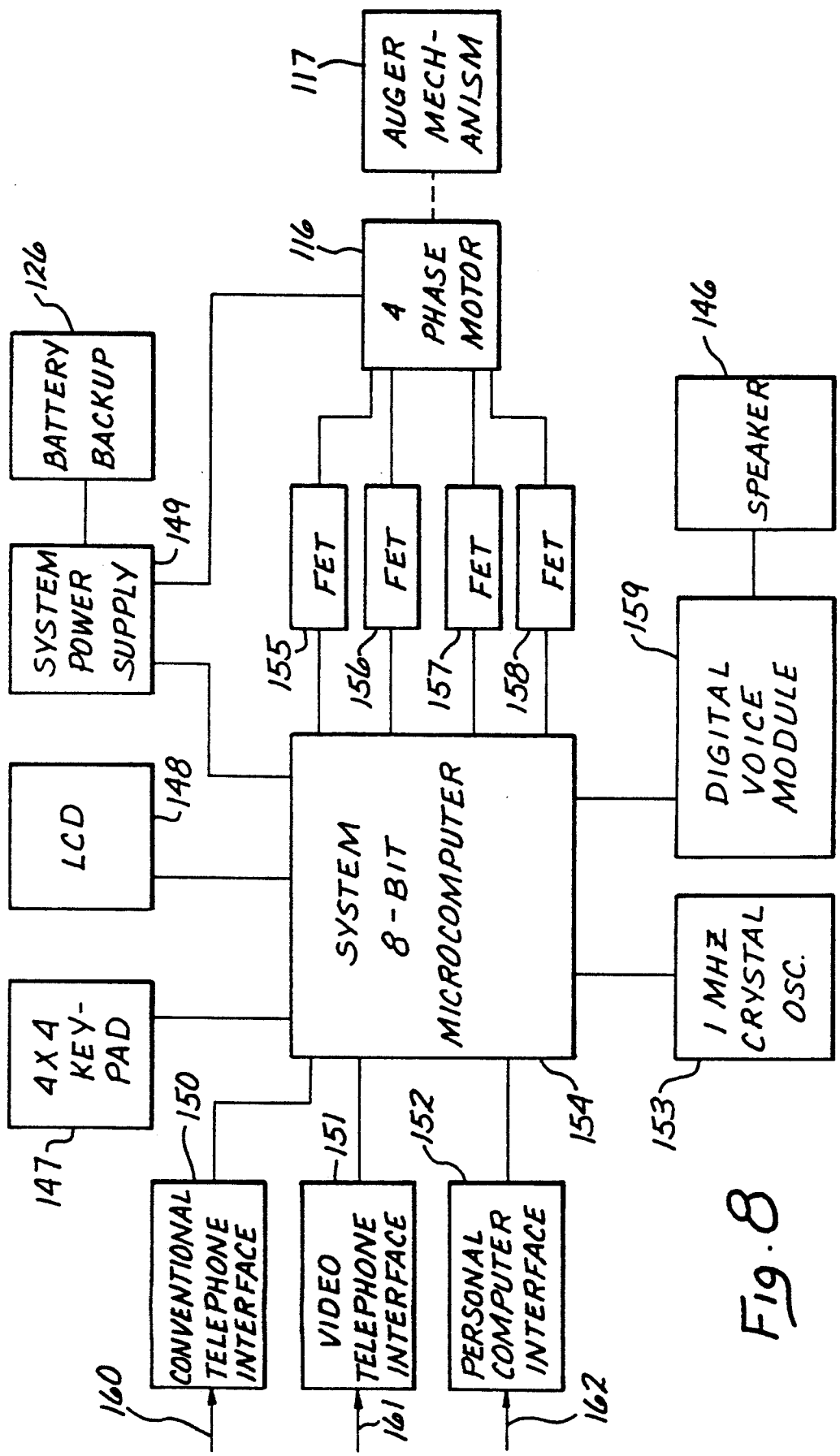
FIG. 8 is a block diagram of the control circuitry.
Figure 9:
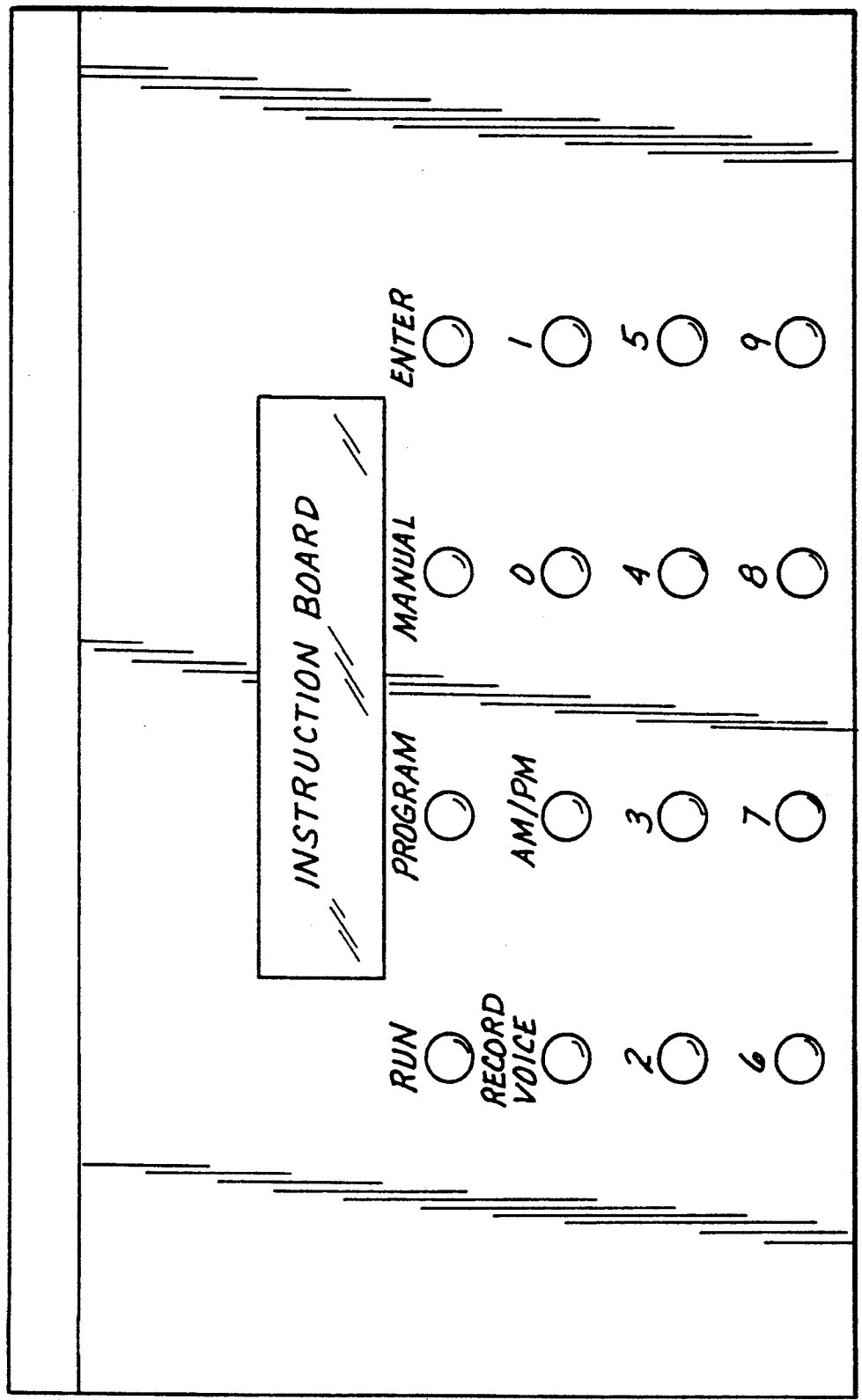
FIG. 9 is an enlarged panel layout.

The block circuit diagram of FIG. 8 shows the aspects of the electronic control circuitry. All of the intelligence for the electronic system is provided by the programmed system 8-bit microcomputer 154. It has a 4K×8 RAM, 128×8 RAM, four 8-bit ports, 32 I/O lines, and two 16-bit timer/event counters. The time base for the microcomputer 154 is provided by a 1 MHz crystal oscillator 153. Programming information for the microcomputer is provided via the 4×4 pressure sensitive membrane keypad 147. Programming information for the user is provided by the LCD instruction board 148.

The microcomputer 154 provides the drive for the four FETs 155–158. The four FETs in turn provide the drive for the four phase rotary stepper motor 116. The microcomputer 154 also controls the digital voice module 159. The digital voice module, when recording the meal call, converts the voice information into digital information using an analog to digital converter, and then stores this information in dynamic RAM. When playing back the meal call message, the digital information is converted back to analog (voice) information using an analog to digital converter and then the voice is played back on the speaker 146. The digital voice module 159 utilizes an internal dedicated microcomputer to coordinate and process all incoming and outgoing information and receives its primary instructions from the system microcomputer. Based upon the foregoing and subsequent descriptions, one of ordinary skill in circuit design and programming can implement the invention using known components and design techniques.

As an example of some commercially available components that may be used, the computer circuitry 154 may include a 80C51 microcomputer that is available from Advanced Micro Devices of Sunnyvale, Calif. The LCD may include a 1×16 LED with driver that is available from IEE of Irvine, Calif.

Conventional 115 VAC, 60 Hz household voltage powers the system power supply 149. The power supply 149 produces direct current that powers the control circuitry 115, including the battery backup circuitry 126 (FIGS. 6 and 8) and the interface circuitry 127 (FIG. 6) which may include one or more of a personal computer interface 152, a video telephone interface 151, and a conventional telephone interface 150 (FIG. 8). The control circuitry 115 also includes microcomputer circuitry 154 for controlling operation and audio circuitry 159 which may include a digital voice module. The power supply 149 powers those circuits and also the stepper motor 116 that drives the auger 117.

Thus, the invention provides an automatic feeder with computerized control circuitry that dispenses different programmed quantities of food for each meal at up to ten programmed times and plays a prerecorded 30-second message in the owner's voice. It creates a friendly, familiar atmosphere. It may include telephone interfaces for conventional and video telephones, an interface for a personal computer, and a battery backup.

Although an exemplary embodiment has been shown and described, one of ordinary skill in the art may make many changes, modifications, and substitutions without necessarily departing from the spirit and scope of the invention.

What is claimed is:

1. An automatic feeder, comprising:
   means in the form of a computerized dispenser for dispensing different programmed quantities of food for each meal to an animal at up to ten programmed times;
   the computerized dispenser including programmable food-dispensing means for dispensing food;
   the computerized dispenser also including means in the form of a microcomputer and integrated control circuitry operatively coupled to the food-dispensing means for automatically controlling the food-dispensing means in order to dispense different programmed quantities of food for each meal at up to ten programmed times; and the integrated control circuitry including digital means for recording and playing audio in order to enable an owner to record a 30-second message for automatic playback at preprogrammed times;

wherein the integrated control circuitry includes at least one of the following selected from the group consisting of means in the form of a telephone interface for enabling remote control with a conventional telephone, means in the form of a video telephone arrangement for enabling an owner to view a space adjacent to the automatic feeder by video telephone and be able to talk to his pet, and means in the form of a computer interface for enabling remote control with a personal computer.

2. An automatic feeder, comprising:

means in the form of a computerized dispenser for dispensing programmed quantities of food to an animal at programmed times;

the computerized dispenser including programmable food-dispensing means for dispensing food;

the computerized dispenser also including means in the form of integrated control circuitry operatively coupled to the food-dispensing means for automatically controlling the food-dispensing means in order to dispense programmed quantities of food at programmed times; and the integrated control circuitry including means for recording and playing audio in order to enable an owner to record a message for automatic playback at preprogrammed times;

wherein the integrated control circuitry includes at least one of the following selected from the group consisting of means in the form of a telephone interface for enabling remote control with a conventional telephone, means in the form of a video telephone arrangement for enabling an owner to view a space adjacent to the automatic feeder by video telephone and be able to talk to his pet, and means in the form of a computer interface for enabling remote control with a personal computer.

3. An automatic feeder as recited in claim 2, wherein the integrated control circuitry includes a microcomputer with a menu-driven LCD display.

4. An automatic feeder as recited in claim 2, wherein the means for recording and playing audio includes at least one of an integrated tape deck and digital recording circuitry.

5. An automatic feeder as recited in claim 2, wherein the dispenser includes water-dispensing means for dispensing water.

6. An automatic feeder as recited in claim 5, wherein the water-dispensing means includes an atmospheric-pressure dispensing arrangement requiring no water level detector or water valve.

7. An automatic feeder as recited in claim 2, wherein:
the computerized dispenser is arranged to be powered from a conventional 110-220 AC source; and
the computerized dispenser includes means in the form of a battery backup arrangement for providing power in the event of a power failure.

8. An automatic feeder, comprising:

means in the form of a computerized food-and-water dispenser for dispensing food and water to an animal;

the computerized food-and-water dispenser including food-dispensing means for dispensing food and water-dispensing means for dispensing water;

the computerized dispenser including means in the form of a microcomputer and integrated control circuitry operatively coupled to the food-dispensing means for causing the food-dispensing means to dispense different programmed quantities of food for each meal at up to ten programmed times; and wherein the integrated control circuitry includes at least one of the following selected from the group consisting of means in the form of a telephone interface for enabling remote control with a conventional telephone, means in the form of a video telephone arrangement for enabling an owner to view a space adjacent to the automatic feeder by video telephone and be able to talk to his pet, and means in the form of a computer interface for enabling remote control with a personal computer.

* * * * *